United States Patent
Anderson

(10) Patent No.: US 7,373,013 B2
(45) Date of Patent: May 13, 2008

(54) DIRECTIONAL VIDEO FILTERS FOR LOCALLY ADAPTIVE SPATIAL NOISE REDUCTION

(75) Inventor: Candace M. Anderson, Rancho Santa Fe, CA (US)

(73) Assignee: General Instrument Corporation, Horsham, PA (US)

( * ) Notice: Subject to any disclaimer, the term of this patent is extended or adjusted under 35 U.S.C. 154(b) by 401 days.

(21) Appl. No.: 10/744,721

(22) Filed: Dec. 23, 2003

(65) Prior Publication Data

US 2005/0135699 A1  Jun. 23, 2005

(51) Int. Cl.
*G06K 9/40* (2006.01)

(52) U.S. Cl. ............... 382/261; 382/260; 382/263; 382/264; 382/275; 358/3.26; 358/3.27; 358/463

(58) Field of Classification Search ........ 382/260, 382/261, 263, 264, 266, 274, 275; 358/1.2, 358/3.26, 3.27, 463
See application file for complete search history.

(56) References Cited

U.S. PATENT DOCUMENTS

| | | | |
|---|---|---|---|
| 4,463,381 A * | 7/1984 | Powell et al. ............ 348/625 |
| 5,025,404 A * | 6/1991 | Janssen et al. ........... 708/290 |
| 5,032,903 A * | 7/1991 | Suzuki et al. ............ 358/530 |
| 5,434,902 A | 7/1995 | Bruijns | |
| 5,469,226 A | 11/1995 | David et al. | |
| 5,537,157 A | 7/1996 | Washino et al. | |
| 5,537,159 A | 7/1996 | Suematsu et al. | |
| 5,600,380 A | 2/1997 | Patel et al. | |
| 5,696,842 A * | 12/1997 | Shirasawa et al. ........ 382/176 |
| 5,844,627 A | 12/1998 | May et al. | |
| 5,867,606 A * | 2/1999 | Tretter .................... 382/261 |
| 5,930,411 A | 7/1999 | Kojima et al. | |
| 5,974,171 A * | 10/1999 | Hayashi et al. .......... 382/162 |
| 5,974,193 A | 10/1999 | Baudouin | |
| 6,005,626 A * | 12/1999 | Ding ................... 375/240.16 |
| 6,049,354 A * | 4/2000 | Sekine et al. ........... 348/208.6 |
| 6,061,100 A * | 5/2000 | Ward et al. ............. 348/607 |
| 6,067,125 A | 5/2000 | May | |
| 6,069,984 A | 5/2000 | Sadler et al. | |
| 6,108,455 A | 8/2000 | Mancuso | |
| 6,122,016 A | 9/2000 | De Haan et al. | |
| 6,229,520 B1 * | 5/2001 | Clatanoff et al. ........ 345/611 |
| 6,229,578 B1 | 5/2001 | Acharya et al. | |

(Continued)

OTHER PUBLICATIONS

Jostschulte, K., et al, "Perception Adaptive Temporal TV-Noise Reduction Using Contour Preserving Prefilter Techniques," IEEE Transactions on Consumer Electronics, vol. 44, No. 3, 1998, pp. 1091-1096.

(Continued)

*Primary Examiner*—Yosef Kassa
(74) *Attorney, Agent, or Firm*—Benjamin D. Driscoll

(57) ABSTRACT

Spatial noise is reduced in an image having a plurality of pixels by detecting object boundaries and unstructured areas in the image and applying 3-tap high pass filters to each pixel in the image in at least four, but less than eight directions to determine the best direction for local low pass filtering. Low pass filtering is applied only along object boundaries and unstructured areas within the image so as to minimize the tendency to blur image edges. Using only four high pass filters to locate horizontal, vertical and diagonal image edges passing through the center of a 3×3 pixel array provides good results.

22 Claims, 8 Drawing Sheets

| D = 1 | | | D = 2 | | | D = 3 | | | D = 4 | | |
|---|---|---|---|---|---|---|---|---|---|---|---|
| 0 | -1 | 0 | 0 | -1 | 0 | -1 | -1 | 0 | -1 | -1 | -1 |
| 0 | 2 | 0 | -1 | -4 | -1 | -1 | 6 | -1 | -1 | 8 | -1 |
| 0 | -1 | 0 | 0 | -1 | 0 | 0 | -1 | -1 | -1 | -1 | -1 |

| | | | | | | | | | | | |
|---|---|---|---|---|---|---|---|---|---|---|---|
| 0 | 60 | 0 | 0 | 30 | 0 | 20 | 20 | 0 | 15 | 15 | 15 |
| 0 | 136 | 0 | 0 | 136 | 0 | 20 | 136 | 20 | 15 | 136 | 15 |
| 0 | 60 | 0 | 0 | 30 | 0 | 0 | 20 | 20 | 15 | 15 | 15 |

Sample highpass filter totals (top) and sum
256 lowpass filters (  = 136/16, relative center weighting = 53%)

U.S. PATENT DOCUMENTS

| | | | |
|---|---|---|---|
| 6,285,798 B1 * | 9/2001 | Lee | 382/260 |
| 6,295,382 B1 | 9/2001 | Karanovic | |
| 6,335,990 B1 | 1/2002 | Chen et al. | |
| 6,411,305 B1 * | 6/2002 | Chui | 345/660 |
| 6,614,944 B1 * | 9/2003 | Levantovsky | 382/261 |
| 6,657,676 B1 * | 12/2003 | Borneo et al. | 348/607 |
| 6,671,340 B1 * | 12/2003 | Kroeger et al. | 375/350 |
| 6,697,660 B1 | 2/2004 | Robinson | |
| 6,763,129 B1 * | 7/2004 | Honda et al. | 382/132 |
| 6,847,737 B1 * | 1/2005 | Kouri et al. | 382/260 |
| 6,965,695 B2 * | 11/2005 | Yamakawa | 382/199 |
| 6,993,191 B2 * | 1/2006 | Petrescu | 382/205 |
| 7,110,602 B2 * | 9/2006 | Krause | 382/199 |
| 7,167,602 B2 * | 1/2007 | Yamashita et al. | 382/300 |

OTHER PUBLICATIONS

Lee, J.S., "Digital Image Enhancement and Noise Filtering by Use of Local Statistics," IEEE Translations on Pattern Analysis and Machine Intelligence, vol. PAMI-2, No. 2, Mar. 1980, pp. 165-168.

Lee, J.S., "Refined Filtering of Image Noise Using Local Statistics," Computer Graphics & Image Processing, vol. 15, No. 4, Apr. 1981, pp. 380-389.

Kuan, D. T., et al., "Adaptive Noise Smoothing Filter for Images with Signal-Dependent Noise," IEEE Transactions on Pattern Analysis and Machine Intelligence, vol. PAMI-7, No. 2, Mar. 1985, pp. 165-177.

* cited by examiner

| k = 0 | | |
|---|---|---|
| diagonal, left | | |
| | | -1/4 |
| | 1/2 | |
| -1/4 | | |

| k = 1 | | |
|---|---|---|
| vertical | | |
| | -1/4 | |
| | 1/2 | |
| | -1/4 | |

| k = 2 | | |
|---|---|---|
| diagonal, right | | |
| -1/4 | | |
| | 1/2 | |
| | | -1/4 |

| k = 3 | | |
|---|---|---|
| horizontal | | |
| | | |
| -1/4 | 1/2 | -1/4 |
| | | |

| k = 4 | | |
|---|---|---|
| corner, up-right | | |
| -1/4 | | |
| 1/2 | -1/4 | |
| | | |

| k = 5 | | |
|---|---|---|
| corner, up-left | | |
| | -1/4 | |
| -1/4 | 1/2 | |
| | | |

| k = 6 | | |
|---|---|---|
| corner, low-left | | |
| | | |
| -1/4 | 1/2 | |
| | -1/4 | |

| k = 7 | | |
|---|---|---|
| corner, low-right | | |
| | | |
| | 1/2 | -1/4 |
| | -1/4 | |

Figure 6

| | k=[0,3] | k=[0,7] | |
|---|---|---|---|
| Minimum Direction | %(4HP) | % (8HP) | Minimum Direction |
| Diagonal Left (k=0) | 48 | 20 | 21 | Corner_UR (k=4) |
| Vertical (k=1) | 65 | 26 | 18 | Corner_UL (k=5) |
| Diagonal Right (k=2) | 12 | 14 | 21 | Corner_LL (k=6) |
| Horizontal (k=3) | 14 | 21 | 19 | Corner_LR (k=7) |
| Total (4HP) | 139 | | 160 | Total (8HP) |

| | | 1 |
|---|---|---|
| | 2 | |
| 1 | | |

| 1 | 1 | |
|---|---|---|
| | 4 | |
| | 1 | 1 |

| | 1 | 1 |
|---|---|---|
| 1 | 6 | 1 |
| | 1 | 1 |

| 1 | 1 | 1 |
|---|---|---|
| 1 | 8 | 1 |
| 1 | 1 | 1 |

| 1 | 2 | |
|---|---|---|
| 2 | 10 | 2 |
| | 2 | 1 |

| 1 | 2 | 1 |
|---|---|---|
| 2 | 12 | 2 |
| 1 | 2 | 1 |

| | 3 | 1 |
|---|---|---|
| 3 | 14 | 3 |
| 1 | 3 | |

| 1 | 3 | 1 |
|---|---|---|
| 3 | 16 | 3 |
| 1 | 3 | 1 |

D = 1

| 0 | -1 | 0 |
|---|---|---|
| 0 | 2 | 0 |
| 0 | -1 | 0 |

| 0 | 60 | 0 |
|---|---|---|
| 0 | 136 | 0 |
| 0 | 60 | 0 |

D = 2

| 0 | -1 | 0 |
|---|---|---|
| -1 | -4 | -1 |
| 0 | -1 | 0 |

| 0 | 30 | 0 |
|---|---|---|
| 0 | 136 | 0 |
| 0 | 30 | 0 |

D = 3

| -1 | -1 | 0 |
|---|---|---|
| -1 | 6 | -1 |
| 0 | -1 | -1 |

| 20 | 20 | 0 |
|---|---|---|
| 20 | 136 | 20 |
| 0 | 20 | 20 |

D = 4

| -1 | -1 | -1 |
|---|---|---|
| -1 | 8 | -1 |
| -1 | -1 | -1 |

| 15 | 15 | 15 |
|---|---|---|
| 15 | 136 | 15 |
| 15 | 15 | 15 |

Figure 13

Sample highpass filter totals (top) and sum
256 lowpass filters ( = t5/16, relative center weighting = 53%)

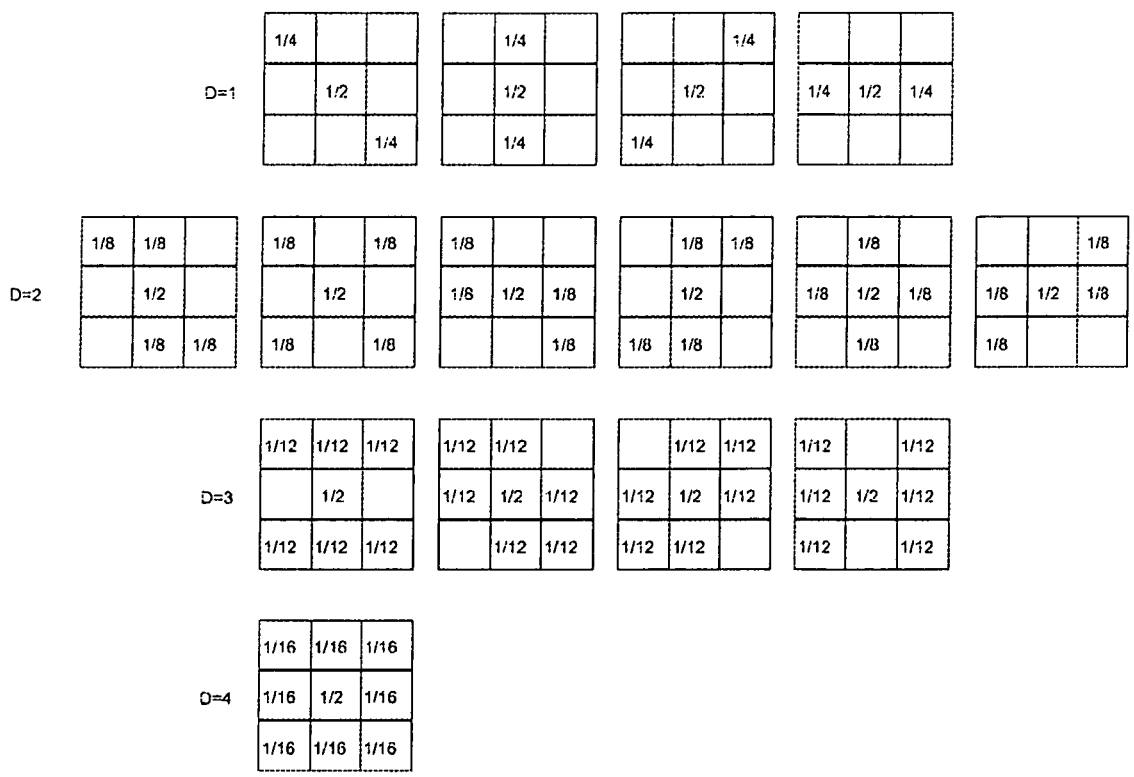

DIRECTIONAL VIDEO FILTERS FOR LOCALLY ADAPTIVE SPATIAL NOISE REDUCTION

FIELD OF THE INVENTION

The present invention relates to video signal processing and, more particularly, to digital filtering techniques for noise elimination.

BACKGROUND

The present invention relates to video (digital) images. Each digital image comprises a plurality (typically hundreds or thousands) of pixels. Each pixel contains information (values) about the chrominance and luminance of a small portion of the image. The present invention relates to a technique for analyzing the individual pixels of a digital image to determine whether the pixel has "noise", then correcting the pixel values to reduce the noise level of the pixel. This is done by "filtering" the pixels of the images.

Correcting or reducing the noise level of image pixels is important for at least two reasons. First, the resulting image can (should) look better (fewer defects). Second, modern digital compression techniques function by detecting changes in images, such as motion, and can benefit from images that have less noise. The overall goal of effective filtering is to reduce abrupt changes, without sacrificing picture quality (sharpness).

A problem which is pervasive to noise filtering is that certain features of images, such as object edges, can look a lot like noise when filtering is performed on a pixel-by-pixel basis. An effective noise-filtering algorithm is one which can reduce noise without sacrificing picture quality. Generally speaking, there are two types of image filtering, "spatial" and "temporal".

In spatial filtering, the value of a given pixel is compared to the values of the pixels surrounding (in the vicinity of, in the neighborhood of) the given pixel, in a given image. The given pixel may, for example, be a center pixel of a 3×3 array of pixels. If, for example, the center pixel in the array had a value of 1000*X, and the surrounding pixels all had a value of 2*X, it could be assumed that the value of the center pixel is erroneous, and it could be altered, using a number of techniques, to bring it into line with the values of the surrounding pixels. In temporal filtering, the values of a given pixel at a specific location within an image is compared with the values for a pixel at the same location in a previous or subsequent image. If the value of a pixel at a certain location within a given image varies dramatically from the value of pixels at the same location within a previous and/or subsequent image, its value can be modified to bring it more into line with what would be expected. Combinations of spatial and temporal filtering are also known.

Noise reduction of a video signal is used to enhance the quality of images comprising the video signal and to prepare for an efficient compression of the video signal. Noise reduction is important in connection with compression of image information, because noise may significantly reduce the effectiveness of compression schemes, particularly frequency-domain compression schemes such as the various MPEG video standards. In image compression technology there is typically a trade-off between compression and image quality; increased compression may tend to reduce image quality. It is not always easy to reconcile these differences so as to achieve high quality highly compressed images. Effective noise reduction in connection with compression of a video signal may well serve both purposes and produce enhanced images in addition to a well-compressed video signal.

Video compression lowers the necessary bandwidth for transmitting moving pictures by removing picture redundancy. This is done in both spatial and temporal domains. The process begins with a conversion from spatial to frequency domain via a Discrete Cosine Transform (DCT). This transform works on square groups of pixels (termed "blocks"). Having transformed the picture from the spatial domain, the bandwidth may be further lowered by use of clever coding schemes such as variable-length (VLC) and run-length coding (RLC).

Noise in video arises from a variety of sources. Most basic is the wideband or Gaussian noise that comes from pickup devices (camera tubes or CCDs), film grain, analog circuits, and so forth. For signals that have been transmitted over analog links, it is also common to see impulse noise. This type of noise is especially common in satellite and microwave links (and may range in intensity from a "sparkle" or two a minute to the "waterfall" of impulses seen in a satellite feed about to go into solar outage), but impulses may also come from inside a facility (the custodian plugging a vacuum cleaner into technical power, for example). A final class of noise, which is termed "surface impairments" comes from, for example, vertical scratches present on film-stock that has been mistreated. Noise in this class may also come from signal cross talk. Once the noise is present in the signal it is very difficult to remove. Historically, techniques such as high-frequency roll-off have been employed, frequently doing more damage to the underlying pictures than the noise itself.

The filters available for reducing noise include both temporal and spatial filters (the vertical filters required external hardware). The present invention applies to spatial filtering. Basic spatial filtering, which applies horizontal and vertical low-pass filtering within a frame, discards both noise and picture detail. This technique can offer a trade off between artifacts and softer pictures, however the effect of soft pictures is easily seen. U.S. Pat. No. 6,229,578 ('578 Patent) discloses an edge-detection based noise removal algorithm. What is disclosed is a method for removing noise by distinguishing between edge and non-edge pixels and applying a first noise removal technique to pixels classified as non-edge pixels and a second noise removal technique to pixels classified as edge pixels. The methodology operates on images while in a Color Filter Array (CFA) domain prior to color interpolation, and uses techniques suited to the classification, whether edge or non-edge.

As discussed in the '578 Patent, in the art of image processing, raw images of an object/scene captured from a sensing or capture device are often subject to varying types of "noise" (elements not present in the object or environment which may nonetheless appear in the image). The noise present in an image may be due to the characteristics of the imaging system such as the sensor or processing steps subsequent to the initial image capture which may add noise while trying to achieve a different purpose. The properties and characteristics that would indicate that a pixel or region of pixels is "noisy" and the properties that would indicate a pixel or region of pixels is an edge or a fine detail of the image are difficult to distinguish. Thus, a fundamental problem with the removal of noise is that often a removal of what is indicated as noise may actually be a removal of fine edge or detail. If the fine detail or edge is removed, a blurring effect may occur within that region of the image further, in color images, the blurring effect leads to a bleeding of one color across the edge to another pixel(s). Noise removal procedures that were based upon linear filtering techniques suffered greatly from this malady and thus, a class of filtering techniques based on ranked order statistics such as the median filter were developed.

As discussed in the '578 Patent, the median filter ranks in order the intensity values belonging to a pixel P (for which the filter is being applied) and pixels in a particular neighborhood or along a particular vector about a pixel P. For example, a median filter (applied in a particular direction(s) through the pixel to neighboring pixels) applied to sample values including and about the pixel P of {12, 13, 200, 50, 14} would first be ranked in order as {12, 13, 14, 118, 200}. The so-called uni-directional finite impulse response (FIR) median hybrid filter would replace the original pixel location P that had a value of 200 with the median of the sample set which is 14. Thus, the output vector, after the filter, would be: {12, 13, 14, 50, 14}. If the value 200 were in fact part of an edge rather than noise, the smoothing caused by applying the filter as shown in the output vector values would decimate the edge feature.

As discussed in the '578 Patent, several improved median filters have been developed to compensate for this problem. One particular such median filter, the multilevel FIR median hybrid filter repeatedly takes the median filter in each direction about an image and applies at each filter the original input pixel. The multi-level median hybrid filter has averaging sub-filters that reduce the burden of sorting operations by averaging pixels in a particular filter direction, and then performing the median computation upon a smaller set of values, such as three. Thus, in a median hybrid filter, two neighboring west pixels would be averaged and the result fed to a median filter along with the average of two neighboring east pixels. The third input to the median filter is the pixel under consideration for noise removal. In other directions, a similar procedure is applied. In a three-level median hybrid filter, the first level pairs all such averaged neighboring pixels with vectors in opposing directions (north with south, etc.) and for each pair of direction averages (8 of them) feeds these into a median filter also along with the pixel of concern as a third input. The resulting median values of the first filter are again paired and along with the pixel of concern are input to a median filter. While median hybrid has been shown to work quite well in discriminating some edges, it is deficient in several respects with regard to edge detection. The median hybrid filter does not consider the noisiness of the edge itself. In other words, an edge's direction, even though eight are employed, cannot be determined with exacting accuracy. For instance, an edge feature may lie at a 33 degree vector from a particular pixel, and thus the eight directions are inadequate in determining the edge feature. In other words, a single pixel may contain a portion that is edge and a portion that is non-edge in the non-discrete world that cannot be represented in the discrete world of digital images. When applied to digital images, the median hybrid filter, if applied everywhere to all pixels, may propagate noise or shift it from pixel to pixel while attempting to remove it since there is noise along the edge feature due to the non-cardinal direction of the edge. A curved edge is a perfect example of such a problem.

U.S. Pat. No. 5,844,627 ('627 Patent) discloses structure and a method for reducing spatial noise. A digital filter for noise reduction selects between local variances obtained from adjacent pixels in the same frame and adjacent pixels in the same field. In one embodiment, the digital filter includes a filter modified from an adaptive Wiener filter which preserves edges and smoothes smooth areas of the image. A high compression ratio can be achieved in very smooth regions of the image without introducing artifacts.

As discussed in the '627 Patent, video noise reduction filters are often provided for removing artifacts ("noise") from a video image which are visible to a human viewer. The objective of noise removal is to create a visually pleasing image. Such noise-reduction filters include median filters and linear low-pass filters. Median filters often introduce additional artifacts which corrupt edges in the image. Linear low-pass filters often blur edges in the image. In general, these techniques are provided to remove visible defects from the image so that, for that purpose, introduction of such additional artifacts generally invisible to the eye is tolerated. However, in video signal processing, these "invisible" artifacts can be detrimental to other objectives, such as achieving a high compression ratio for storage and transmission of the video image. A lower compression ratio requires the video processing system to operate at either a higher bit rate (in a variable bit rate encoding application) or a lower image quality (in a fixed bit rate encoding application).

As discussed in the '627 Patent, in the prior art, the Wiener filter and its adaptive field/frame variants are noise-reduction digital filters which have been extensively studied. For example, some local Wiener filters are described in (i) "Digital Image Enhancement and Noise Filtering by Use of Local Statistics" by J. S. Lee, IEEE Transactions on Pattern Analysis and Machine Intelligence, Vol. PAMI-2, No 2, March 1985, pp. 165-168; (ii) "Refined Filtering of Image Noise Using Local Statistics", J. S. Lee, Computer Graphics and Image Processing 15, 380-389 (1981); and (iii) "Adaptive Noise Smoothing Filter for Images with Signal-Dependent Noise", Kuan et al, IEEE Transactions on Pattern Analysis and Machine Intelligence, Vol. PAMI-7, No. 2, March 1985, pp. 165-177. Specifically, local Wiener filters operate on each pixel of an image based on the mean value and the variance value of a finite number of pixels in the immediate vicinity of that pixel. Wiener filters are important in video compression processing for two reasons. First, Wiener filters remove noise that is not very visible to the eye, such as noise related to film grain. Second, as compared to the noise-reduction filters discussed above (e.g. the median filter), a Wiener filter is less prone to introduce new defects, especially those visible to the eye. Thus, Wiener filters are often used to improve compression efficiency.

FIG. 1A, corresponding to FIG. 3a of the '627 patent, shows a pixel's 3×3 neighborhood formed by pixels in the same frame, according to the prior art. The pixel to be filtered is shown in fine cross-hatching, centered among its eight neighbors in the neighborhood, which are shown in coarse cross-hatching.

FIG. 1B, corresponding to FIG. 3b of the '627 patent, shows a pixel's 3×3 neighborhood formed by pixels of the same field, according to the prior art. The pixel to be filtered is shown in fine cross-hatching, centered among its eight neighbors in the neighborhood, which are shown in coarse cross-hatching.

FIG. 1A shows the nine pixels in the 3×3 neighborhood. A neighborhood mean ("field-based mean") and a neighborhood variance ("field-based variance") are computed for each pixel, based on averaging and computing the variance of the nine pixels of the same field in the pixel's 3×3 pixel neighborhood.

FIG. 1B shows the nine pixels in the 3×3 neighborhood. For each pixel $g(i,j)$ in the frame, the smaller of the frame-based and field-based neighborhood variances, and its associated neighborhood mean, are chosen to be the neighborhood variance (designated $\sigma_g^2(i,j)$) and neighborhood mean (designated bar-g(i,j)), respectively, for that pixel. Independently, the frame-based and field-based neighborhood variances obtained are summed and accumulated for the entire image. The resulting value is used to compute a noise variance (designated $\sigma_n^2$) for a global noise signal. Various ways are disclosed for computing $\sigma_n^2$.

U.S. Pat. No. 6,335,990 ('990 Patent) discloses a system and method for spatial temporal-filtering for improving compressed digital video. A filter that filters in the spatial and temporal domain in a single step with filtering coefficients that can be varied depending upon the complexity of the video and the motion between the adjacent frames comprises: a IIR filter, a threshold unit, and a coefficient register. The IIR filter and threshold unit are coupled to receive video data. The IIR filter is also coupled to the coefficient register and the threshold unit. The IIR filter receives coefficients, a, from the coefficient register and uses them to filter the video data received. The IIR filter filters the data in the vertical, horizontal and temporal dimensions in a single step. The filtered data output by the IIR filter is sent to the threshold unit. The threshold unit compares the absolute value of the difference between the filtered data and the raw video data to a threshold value from the coefficient register, and then outputs either the raw video data or the filtered data.

FIG. 2, corresponding to FIG. 1 of the '990 patent, is a block diagram of a video processing system including a filter used as a pre-filter, according to the prior art. This video processing system illustrates use of a filter as a pre-filter. As shown, a stream of raw video data is received at the input to the pre-filter. The pre-filter processes and filters the data, and outputs the filtered data. The output of the pre-filter is coupled to a compression unit which compresses the filtered video data and outputs the compressed data to a decompression unit. While the coupling between the compression unit and the decompression unit is shown as an electrical coupling, those skilled in the art will realize that the transmission of the compressed data may take a variety of formats including transfer across a LAN, transfer across the ISDN, transfer across the ATM, transfer across the Internet, transfer through the satellite, transfer through the cable TV or transfer to and from a floppy disk, CD-ROM or other similar suitable medium. The compressed data is provided on the input of the decompression unit. The decompression unit in turn decompresses the data to recreate the filtered video data that is then sent to the display device for presentation to the user. As used in the context of FIG. 2, the pre-filter is preferably provided with coefficients such that the filtered bit stream output after having been compressed and decompressed has a substantially better display quality as compared to bit streams that have not been filtered.

U.S. Pat. No. 6,295,382 ('382 Patent) discloses method and apparatus for establishing an adaptive noise reduction filter. The method and apparatus for adaptive noise filtering within a video graphics circuit includes determining an average intensity for a kernel of a display area. The kernel includes a plurality of pixels arranged in a particular manner, for example a square, a rectangle, etc. Next, a variance for a pixel within the kernel is determined. Based on a relationship between the average intensity and the variance, a signal-to-noise factor is determined. The signal-to-noise factor includes a noise region, a signal region, and an edge region. The pixel within the kernel is then adaptively filtered based on the signal-to-noise factor, the average intensity, and intensity of the pixel.

As discussed in the '382 Patent, an adaptive filter filters noise based on the equation:

$Y_{out}=K*X_c+(1-K)\mu$, where $K=\text{Sigma}^2/(\text{Sigma}^2_l+\text{Sigma}^2_n)$.

In this equation, $\mu$ represents the average pixel value (color, texture, alpha blending, etc.) of the pixels covered by the filter, Sigma.sup. 2 represents the variance within the display screen, $\text{Sigma}^2/\text{Sigma}^2_l$ represents the local variance, and $\text{Sigma}^2_n$ represents the noise floor. Further, $\mu=(1/L * W)\Sigma_i\Sigma_j X_{ij}$, where W represents the width (with respect to the x-direction) of the filter and L represents the length (with respect to the y-direction) of the filter. For example, a 3×3 filter encompassing 9 pixels where L equals 3 and W equals 3 wherein Xc represents the center pixel of the filter.

As discussed in the '382 Patent, when this filter is applied to an input video signal, it attenuates noise based on the adaptive filtering equation. In general, when there is significant noise, the K term approaches 1, thus the filter filters Xc based primarily on the pixel value of Xc (i.e., the K*Xc term dominates). When there is little noise, the K term approaches 0, thus the filter filters Xc based on the average pixel value of the pixels covered by the filter (i.e., the (1-K) $\mu$ term dominates). When the noise level is in between, both terms contribute to the filtering of the pixel providing additional filtering when it is not needed. As a result, images appear smoother than intended because definition of the edges of the images has been diluted. As such, the desired video quality is less than optimal.

One of the best known and most widely used video compression standards for encoding moving picture images (video) and associated audio is the MPEG-2 standard, provided by the Moving Picture Experts Group (MPEG), a working group of the ISO/IEC (International Organization for Standardization/International Engineering Consortium) in charge of the development of international standards for compression, decompression, processing, and coded representation of moving pictures, audio and their combination. The ISO has offices at 1 rue de Varembé, Case postale 56, CH-1211 Geneva 20, Switzerland. The IEC has offices at 549 West Randolph Street, Suite 600, Chicago, Ill. 60661-2208 USA.

The international standard ISO/IEC 13818-2 "Generic Coding of Moving Pictures and Associated Audio Information: Video", and ATSC document A/54 "Guide to the Use of the ATSC Digital Television Standard" describes the MPEG-2 encoding scheme for encoding and decoding digital video (and audio) data. The MPEG-2 standard allows for the encoding of video over a wide range of resolutions, including higher resolutions commonly known as HDTV (high definition TV).

In MPEG-2, encoded pictures are made up of pixels. Each 8×8 array of pixels is known as a "block." A 2×2 array of blocks is referred to as a "macroblock." MPEG-2 video compression is achieved using a variety of well known techniques, including prediction (motion estimation in the encoder, motion compensation in the decoder), 2-dimensional discrete cosine transformation (DCT) of 8×8 blocks of pixels, quantization of DCT coefficients, and Huffman and run-length coding. Reference frame images, called "I-frames" are encoded without prediction. Predictively-coded frames known as "P-frames" are encoded as a set of predictive parameters relative to previous I-frames or previous P-frames. Bi-directionally predictive coded frames known as "B-frames" are encoded as predictive parameters relative to both previous and subsequent I-frames and P-frames.

The MPEG-2 standard specifies formatting for the various component parts of a multimedia program. Such a program might include, for example, MPEG-2 compressed video, compressed audio, control data and/or user data. The standard also defines how these component parts are combined into a single synchronous bit stream. The process of combining the components into a single stream is known as multiplexing. The multiplexed stream may be transmitted over any of a variety of links, such as Radio Frequency Links (UHF/VHF), Digital Broadcast Satellite Links, Cable TV Networks, Standard Terrestrial Communication Links, Microwave Line of Sight (LoS) Links (wireless), Digital Subscriber Links (ADSL family), Packet/Cell Links (ATM, IP, IPv6, Ethernet).

U.S. Pat. No. 5,974,193 ('193 Patent) discloses a technique for noise reduction in association with MPEG-1 and MPEG-2 encoding of video signals.

As discussed in the '193 Patent, an MPEG transmission system allows several video, audio and associated services to be multiplexed and sent over a single digital transmission channel. The number of services and hence the cost of transmission bandwidth per service is determined by the bit rate. Any improvement in picture quality or reduction in bit rate is thus very important to a service provider.

As explained in the '193 Patent, most sources of video produce random noise: camera noise, tape noise and the digital re-transmission of existing analog services are typical examples of systems introducing noise. Although much of this noise is often biased towards the high frequency parts of the spectrum and is not particularly visible in an analog system, MPEG encoding of such material often introduces Discrete Cosine Transform (DCT) effects or artifacts that "crawl" around the picture.

As also mentioned in the '193 Patent, there are two main reasons for these effects being produced. First, the presence of noise causes many small amplitude high frequency DCT coefficients to be generated and sent in the bit stream. These coefficients tend to be more inaccurately quantized than the low frequency coefficients and are generally due to the noise only. The increase in the number of bits transmitted causes the quantization Parameters factor (QP) to become higher in order to maintain the same bit rate. The net result is that the whole picture is reduced in quality. The Forward Prediction (P) and Bi-directional prediction (B) frames that follow the Intra (I) frame try to constantly correct for the noise in the prediction path and so this results in the DCT artifacts changing from frame to frame. The second reason for the loss in picture quality is that the accuracy of the motion estimation is reduced with the presence of noise in the encoder itself. This produces even worse predictions in the 'B', and 'P' frames which inevitably increases the QP and reduces picture quality.

A spatio-temporal noise reduction scheme for interlaced video is disclosed in "Perceptive Adaptive Temporal TV-Noise Reduction using Contour Preserving Prefilter Techniques", K. Jostschulte, A. Amer, M. Schu, H. Schroeder, IEEE Transactions of Consumer Electronics, Vol.44, No.3, pp. 1091-1098, 1998 ("Jostschulte"). The noise reduction scheme consists mainly of a subband based temporal recursive filter which makes use of some special properties of the human visual system. This temporal system is supported by a preceding detail preserving spatial filter with low hardware expense, which consists of an image analyzing high pass filter bank and an adaptive low pass FIR-filter for noise reduction. Both the spatial and temporal noise reduction were evaluated with a large amount of simulations that result in a very good objective and subjective efficiency. Furthermore, the chain of both temporal and spatial noise reduction may even yield results which are better than the sum of pure spatial and temporal techniques.

Jostschulte is geared towards improvement of image quality techniques in consumer television receivers. One of these image quality improvement tasks is noise reduction.

The image can be corrupted by noise in different ways. Some noise sources are located in a camera and become active during image acquisition especially under bad lighting conditions. Here different types of noise are added due to the amplifiers and other physical effects in the camera. Further noise sources take effect due to transmission over analog channels, e.g. satellite or terrestrial broadcasting. Digital transmission inserts other distortions which also may have a noisy characteristic. Further noise is added by image recording devices such as VCRs. In these devices, additive white Gaussian noise or, in the case of tape drop-outs, impulsive noise is added to the signal. Because of this it can be very important in a television receiver to perform a final reduction of all these distortions.

Spatial noise reduction is performed by application of linear or nonlinear operators which use correlations within an image. But a spatial noise reduction only has a subjective and objective gain if edges are preserved. So this filter must be controlled by a special image analyzer which controls the coefficients of such a filter.

In Jostschulte, a complete system of a spatio-temporal noise reduction scheme is presented. Jostschulte aptly notes that the problem of a spatial noise reduction scheme is to eliminate spatially uncorrelated noise from spatially correlated image content. One way of doing this is with a spatial low pass filter. Such a filter can be implemented, e.g., as a horizontal, vertical or diagonal 3-tap FIR-filter as depicted in FIG. 2 of Jostschulte, which is reproduced as FIG. 3 herein. This figure is a block diagram of a simple filter for spatial noise reduction.

FIG. 4, corresponding to FIG. 4 of Jostschulte, is a block diagram of a filter for detail preserving spatial noise reduction. FIG. 5, corresponding to FIG. 5 of Jostschulte, is a diagram illustrating eight masks for filtering a pixel.

As discussed in Jostschulte, the filter is assumed to have input noise variance $\sigma^2_{in}$. The resulting output variance $\sigma^2_{out}$ of this filter is given in the following equation:

$$\sigma^2_{out} = r^2 * \sigma^2_{in} + 2*((1-r)/2)^2 * \sigma^2_{in}$$

With the assumption that the filter does not influence the original image signal, the noise reduction R (ratio of signal to noise values of input and output) of such type of filter is given by:

$$R[dB] = 10*\log(\sigma^2_{in}/\sigma^2_{out}) = 10*\log(2/(3r^2 - 2r + 1))$$

The dependency of the central coefficient and the noise reduction of such a filter is depicted in Jostschulte FIG. 3 (not shown herein). For a simple $\cos^2$-shaped filter, a noise reduction value of 4.26 dB results. The maximum is achieved for a mean filter.

As noted in Jostschulte, the disadvantage of such a system is the tendency to blur edges and lines of the image. For this reason, a spatial noise reduction has to be adaptive to the spatial image content. In other words, a spatial filter only has to be applied along object boundaries or in unstructured areas. As a result, an image analyzing step has to be applied which controls the direction of the low pass filter. This is shown in FIG. 4 (corresponding to FIG. 4 of Jostschulte).

Jostschulte mentions that several algorithms for precise detection of edge-directions are known, but that nearly all of them have in common that a hardware implementation will be very expensive. In this case, the demand was a system that is easy to implement. So another method of detecting edge-directions was chosen. It consists of a set of high pass filters which are able to detect eight different directions of edges and structures.

FIG. 5 (corresponding to FIG. 5 of Jostschulte) depicts eight different masks for directions of analyzing and filtering. All are based on a 3×3 array of pixels, with the pixel being analyzed/filtered at the center of the array. The pixel in the center of the array is, of course, included in all of the masks. As can be seen, special masks for corners are also considered. According to Jostschulte, if this were not the case, sharpness in object-corners could be lost.

Mask 1 includes the three pixels extending horizontally across the center of the 3×3 array. Mask 2 includes the three pixels extending vertically up the center of the 3×3 array. Mask 3 contains the three pixels extending diagonally, from top left to bottom right, across the array. Mask 4 has the three pixels extending diagonally, from top right to bottom left, across the array. Mask 5 includes the center right pixel and the center bottom pixel, defining a lower right corner. Mask 6 includes the center left pixel and the center bottom pixel, defining a lower left corner. Mask 7 includes the center left pixel and the center top pixel, defining a top left corner. Mask 8 includes the center right pixel and the center top pixel, defining a top right corner.

In the image analyzer, zero-mean high pass filters with coefficients $\{-\frac{1}{4}, \frac{1}{2}, -\frac{1}{4}\}$ are applied along all given directions for each pixel of the image. The direction with the lowest absolute high pass output is chosen to be the direction of the local picture contour. The result is that the following low pass filter of the same direction will not blur structures in the image.

Simulations concerning the PSNR result in noise reduction values R of 1 dB up to 2 dB. The amount of noise reduction was found to be dependent on the contents of the image. In structured areas, the results were higher than in nearly unstructured areas. The loss in unstructured areas can be explained with the tendency of the analyzing filter to fail in noise structures. In such cases, the mask selection is not uncorrelated to noise. That is the reason why theoretical values of R are higher than simulated ones. But even in completely unstructured images, the noise reduction is about 1 dB.

Pre-processing video to reduce entropy by attenuating spatial noise allows a trade-off between compression and smoothing artifacts. Locally adaptable directional low pass filtering as described in Jostschulte minimizes edge blurring, but provides no means to adjust the degree of smoothing for optimized quality at a given bit rate. It would be advantageous to provide a system and methods for adjusting the degree of smoothing, thereby optimizing quality.

The present invention provides directional video filtering techniques for locally adaptive spatial noise reduction having the aforementioned and other advantages.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following glossary of terms is intended to lend clarity and consistency to the various descriptions contained herein, as well as in prior art documents:

DCT Discrete Cosine Transform

FIR Finite Impulse Response

MPEG Moving Picture Experts Group, a standards organization dedicated primarily to digital motion picture encoding.

MPEG-2 an encoding standard for digital television (officially designated as ISO/IEC 13818, in 9 parts)

MPEG-4: A variant of a MPEG moving picture encoding standard aimed at multimedia applications and streaming video, targeting a wide range of bit rates. Officially designated as ISO/IEC 14496, in 6 parts.

PSNR Peak Signal to Noise Ratio

SNR Signal to Noise Ratio

SUMMARY OF THE INVENTION

A filtering technique is provided for spatial noise reduction in video images. The technique can be implemented as a pre-processing filter to improve the quality of compressed video, such as MPEG-1, MPEG-2, or MPEG-4 video, including compressed video for broadcast or multi-media streaming. The invention extends directional low pass filtering for pre-processing video sequences prior to compression by providing both parametric adjustment of degree of smoothing and reduced computational burden for simple implementation.

Commonly-used spatial low pass filters that apply the same degree of smoothing to an entire image have been observed, in subjective tests, to actually decrease the quality of compressed video compared to unsmoothed input in some cases.

According to the invention, a technique is provided for reducing spatial noise (performing smoothing) in an image having a plurality of pixels. The technique comprises detecting object boundaries and unstructured areas in the image by applying 3-tap high pass filters to each pixel in the image in at least four, but less than eight directions to determine the best direction for local low pass filtering; and applying low pass filtering only along object boundaries and unstructured areas within the image so as to minimize the tendency to blur image edges. Using only four high pass filters to locate horizontal, vertical and diagonal image edges passing through the center of a 3×3 pixel array provides good results.

An optimum direction for low pass filtering may be determined by using tap coefficients of $\{-\frac{1}{4}, \frac{1}{2}, -\frac{1}{4}\}$. The center tap coefficients for the high pass filters are fixed. The center tap coefficients for the low pass filters may be varied from zero to unity.

The low pass filtering is suitably applied to pixel luminance values. The low pass filtering may be restricted to directions that do not cross image edges.

Features of the invention include:

1) multi-directional averaging to change low pass filter shape without explicit changes in FIR coefficients,
2) offset parameter to promote smoothing,
3) parametric center tap weighting to adjust the degree of smoothing by changing the width of the low pass filter passband,
4) fewer local edge detention filters to reduce computational burden by a factor of two, and
5) a method for algorithm implementation in integer arithmetic without loss of precision.

BRIEF DESCRIPTION OF THE DRAWINGS

FIG. 6 is a diagram illustrating eight high-pass 3×3 filters to determine local edge directionality, according to the prior art.

FIG. 7 is a table listing directionality effects for the reduction in the number of filters from eight to four, according to an example demonstration sub-image in accordance with the invention.

FIGS. 8A and 8B are expanded views of scaled low pass filter maps for four and eight high pass filters, respectively, for a demonstration sub-image, according to the invention.

FIG. 9 is a diagram of all orientations of 15 total low pass filter weights for number of equal directions using four high pass filters, according to the invention.

FIG. 10 is a table showing low pass filter weights for the number of equal directions (D=[1,8]), using eight high pass filters, according to the invention.

FIGS. 11(A and B) are diagrams showing low pass filter combinations for eight high pass filter directions D=[1,8], according to the invention.

FIG. 13 is a diagram of sample scaled high pass filter tap totals (top) and sum for gain-256 low pass filters ($\alpha=15/16$, relative center weighting=53%), according to the invention.

DETAILED DESCRIPTION

Figure 1A:
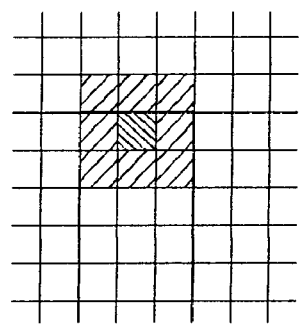
FIG. 1A is a diagram showing a pixel's 3×3 neighborhood formed by pixels in the same video frame, according to the prior art.
Figure 1B:
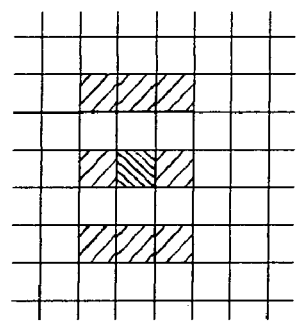
FIG. 1B is a diagram showing a pixel's 3×3 neighborhood formed by pixels of the same video field, according to the prior art.
Figure 2:
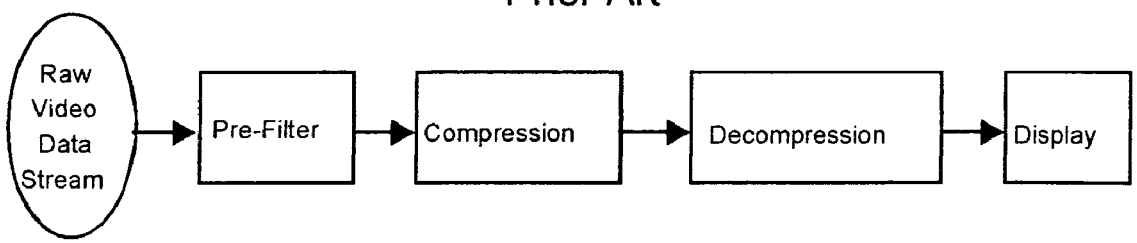
FIG. 2 is a simplified block diagram of a video processing system including a pre-filter, according to the prior art.
Figure 3:
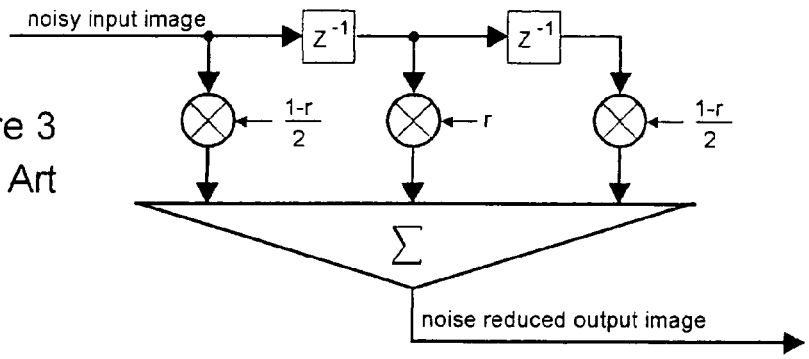
FIG. 3 is a block diagram of a simple filter for spatial noise reduction, according to the prior art.
Figure 4:
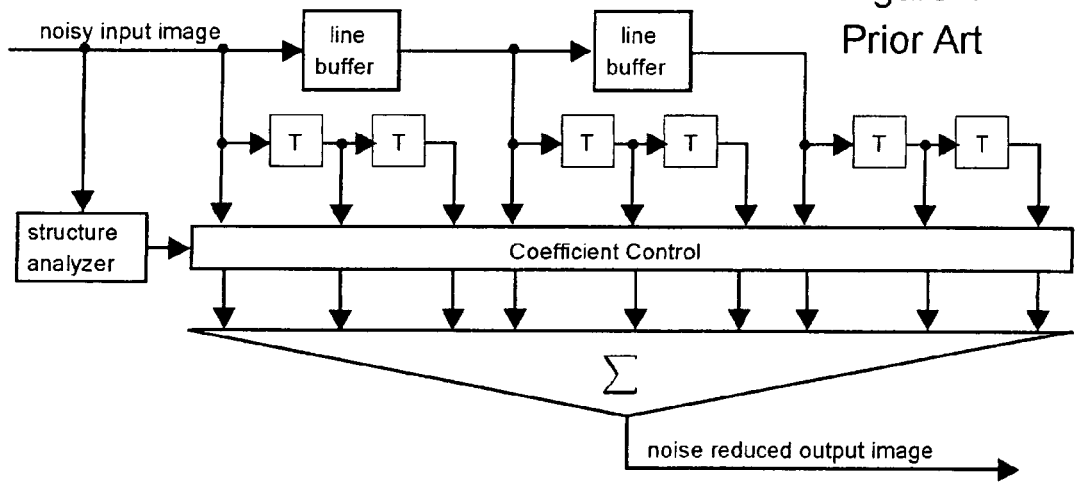
FIG. 4 is a block diagram of a filter for detail preserving spatial noise reduction, according to the prior art.

The invention relates generally to directional adaptive filters for spatial noise reduction pre-processing in conjunction with video compression. More specifically, the directionally adaptive spatial smoothing filters described herein are based upon applying low pass filtering only along object boundaries and unstructured areas so as to minimize the tendency to blur image edges.

Local edge detection for each pixel in an image may be accomplished by applying 3-tap high pass filters in eight directions to determine the best direction for local low pass filtering, such as has been described in "Perception Adaptive Temporal TV-Noise Reduction Using Contour Preserving Prefilter Techniques", Jostschulte, K., Amer, A., Schu, M., Schroeder, H., IEEE Trans. of Consumer Electronics, Vol. 44, No. 3, pp. 1091-1096 ("Jostschulte"). Jostschulte has been discussed, hereinabove.

Several enhancements to the basic directional low pass filtering algorithm as presented in Jostschulte have been developed for the spatial noise reduction method. The following specific additions to the basic approach both simplify directional denoising implementation and add considerable flexibility for adjusting the degree of smoothing required to maximize video quality for a desired bit rate:

1. Reduction of the number of high pass directional filters from eight to four reduces the computational burden by a factor of two.
2. Application of multi-directional low pass filtering when high-pass results are nearly (substantially) equal in absolute value results in filter shape variation without explicit tap weight changes.
3. Introduction of an offset parameter promotes smoothing even when the minimum absolute value of the high pass filters is zero.
4. Variance of relative weighting of center low pass filter coefficient from zero to unity offers additional adjustment in the degree of smoothing applied.

Details and results of these adaptations are discussed herein below. The basic directional smoothing algorithm will be described. Filter design improvements including filter number reduction, multi-directional averaging with offset, and center weighting variation will also be described.

Directional Filter Design

Directionally adaptive spatial noise reduction is based upon restricting local low pass filtering to directions that do not cross image edges. As shown in FIG. 6, simple 3-tap zero-mean high pass filters used to determine the optimum direction for smoothing have coefficients $\{-1/4, 1/2, -1/4\}$. The set of four high pass filters in the top row (k=0, k=1, k=2, k=3) can be used to locate horizontal, vertical and diagonal edges passing through the center of a 3×3 pixel array. The bottom row in the figure shows four additional filters (k=4, k=5, k=6, k=7), which are recommended by Jostschulte for determining edges with right angle corners through the center. Comparing results of the eight high pass filters with the minimum absolute value for each pixel in the image is chosen as the direction for low pass filtering using the coefficients $\{1/4, 1/2, 1/4\}$.

Figure 5:
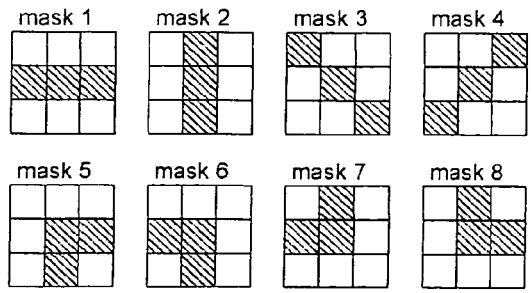
FIG. 5 is a diagram illustrating eight masks for a filter, according to the prior art.

Generally, the eight high pass filters illustrated in FIG. 6 correspond to the eight masks illustrated in FIG. 5, as follows:

| Nomenclature | FIG. 5 | FIG. 6 |
| --- | --- | --- |
| horizontal | mask 1 | k = 3 |
| vertical | mask 2 | k = 1 |
| diagonal, right | mask 3 | k = 2 |
| diagonal, left | mask 4 | k = 0 |
| corner, low-right | mask 5 | k = 7 |
| corner, low-left | mask 6 | k = 6 |
| corner, up-left | mask 7 | k = 5 |
| corner, up-right | mask 8 | k = 4 |

The step-by-step process for basic directional smoothing proceeds as follows:

1. For each pixel p(i,j) in a video frame of I rows by J columns, compute a set of zero-mean high-pass filters with tap weights $\{-1/4, 1/2, -1/4\}$ in accordance with equation (1):

$$\mathrm{hp\_filt}(i, j, k) =$$

$$\begin{cases} (2p(i, j) - p(i-1, j+1) - p(i+1, j-1))/4 & k = 0, \text{(diagonal\_left)} \\ (2p(i, j) - p(i-1, j) - p(i+1, j))/4 & k = 1, \text{(vertical)} \\ (2p(i, j) - p(i-1, j-1) - p(i+1, j+1))/4 & k = 2, \text{(diagonal\_right)} \\ (2p(i, j) - p(i, j-1) - p(i, j+1))/4 & k = 3, \text{(horizontal)} \\ (2p(i, j) - p(i-1, j) - p(i, j+1))/4 & k = 4, \text{(corner\_upper\_right)} \\ (2p(i, j) - p(i-1, j) - p(i, j-1))/4 & k = 5, \text{(corner\_upper\_left)} \\ (2p(i, j) - p(i, j-1) - p(i+1, j))/4 & k = 6, \text{(corner\_lower\_left)} \\ (2p(i, j) - p(i, j+1) - p(i+1, j))/4 & k = 7, \text{(corner\_lower\_right)} \end{cases}$$

(The top and bottom horizontal rows, and the leftmost and rightmost vertical columns in the 3×3 array can either be left unfiltered, or can be computed by replicating to produce an (I+1) by (J+1) image).

2. Determine the high-pass filter with the minimum absolute value as expressed in equation (2):

$$|\mathrm{hp\_min}(i,j,k_{min})| = \min_k(|\mathrm{hp\_filt}(i,j,k)|)$$

3. Apply a simple unity gain 3×3 low pass filter with tap weights $\{¼, ½, ¼\}$ in the direction of $k_{min}$ for local smoothing of the image pixel p(i,j). Direct calculation from the signed value can be easily be computed by simple subtraction:

$$lp\_filt(i,j) = p(i,j) - |\mathrm{hp\_filt}(i,j,k_{min})|$$

Reduction in Number of Directional High Pass Filters

For a sample image (sub-image, or selected portion of a larger video frame) having 72×72 (5184) pixels, and containing edge features, the absolute values for eight high pass filters (k=[0,7]) were determined. The results were mapped, using a pseudo-color bitmap technique, wherein the effectiveness of each filter in distinguishing edge features could be compared, one against the other. A pseudo-color bitmap for a local maximum ("best of the eight") high pass filter absolute value of all eight directions was also generated wherein the edge features were prominently visible. In this manner, the results could be visualized, and subjectively rated.

According to an aspect of the invention, a reduced number of directions are used for spatial noise reduction (smoothing). In order to determine the effectiveness of using a reduced number of directions for spatial noise reduction, using the same sample image, results were determined using only the four high pass filters shown in the top row of FIG. 6 (i.e., k=0, k=1, k=2, k=3). It was observed that, although somewhat less distinctly, the edges seen previously for eight high pass filters were still visible for the maximum absolute value of only the two diagonal, one vertical and one horizontal directions (k=[0,3]) using the same color scale. Four high pass filters provide satisfactory performance. Five, six or seven could be used, but that would partially defeat the purpose of the invention, which is to reduce the number of high pass filters and directions, thereby simplifying the overall design.

Color maps were also generated illustrating the degree of low pass filtering that will result for the minimum direction for the cases of both four and eight filters. Comparing these two bitmaps, it became apparent that while they both exhibit a large number of zero $|\mathrm{hp\_min}(i,j,k_{min})|$ minima, the number of pixels unchanged by low pass filtering will be far greater when eight filters are used.

In addition to comparing the position and degree of low pass filtering, it is also useful to observe directionality effects for the reduction in the number of filters from eight to four. Distribution statistics for each filtered pixel in the demonstration sample sub-image were calculated by summing the number of high pass directions for which the absolute value matches that of the minimum. The relative occurrences of the equality $|\mathrm{hp\_filt}(i,j,k)| = |\mathrm{hp\_min}(i,j,k_{min})|$ for each direction are listed in the table of FIG. 7 as percentages (%) of a total of 72*72=5184 filtered pixels, for both k=[0,3] (column 2) and k=[0,7] (columns 3 and 4). (Column 3 relates to the horizontal, vertical and two diagonal filters for the case of eight filters, and Column 4 relates to the corner filters for the case of eight filters.)

In FIG. 7, it can be seen that while the distribution is rather constant across the eight directions (14%-26%) in this particular example, that the distribution for only four filters is heavily skewed toward the vertical (65%) and the diagonal left (48%) directions.

In the example demonstration sub-image shown in FIG. 7, it can be seen that the totals for the two cases of k=[0,3] and k=[0,7] are 139% and 160%, respectively. The way to take advantage of these distribution totals in excess of 100% will be described in greater detail, herein below, in a discussion of multi-directional averaging.

The demonstration sub-image (72×72 pixels) was further processed. To accentuate low pass filter directions, extra rows and columns were inserted so that each pixel in a filtered sub-image is displayed as a 3×3 array. The processing steps are:

1. Create 216×216 arrays for each direction by adding 2 rows and 2 columns between each pixel p(i,j) in the 72×72 sub-image. (216 =72×3)
2. Assign values of {1,2,1} to the appropriate 3 pixels in the 3×3 array centered on p(i,j) for each high pass filter direction k for which the absolute value matches that of $|\mathrm{hp\_min}(i,j,k_{min})|$ as defined in equation (2)
3. Sum over the number of directions considered, and create a bitmap (e.g., having shading corresponding to values).

Visual comparison of the two bitmaps so computed for four and eight filters showed similarities as well as differences. For a first region in the sub-images, the maps exhibited filtering primarily in the left diagonal (k=0) direction. Conversely, while contributions inside another region in the sub-image 4-filtered pseudo-image (k=[0,3]) were again dominated by left diagonal filtering, those on the 8-filtered pseudo-image (k=[0,7]) reflected low pass filtering in the right-angle corner directions as well.

FIGS. 8A and 8B are expanded views of low pass filter maps for four and eight high pass filters, respectively, for a demonstration sub-image, showing relative weighting for D=[1,4] and D=[5,8] equal directions (filter normalization sums equal 4D for D=[1,8]).

Multi-Directional Averaging

As evidenced by the directional distribution totals in excess of 100% recalled from FIG. 7 for the demonstration sub-image, the value of $|\mathrm{hp\_filt}(i,j,k)|$ can match that of $\mathrm{hp\_min}(i,j,k_{min})$ for more than a single value of k. The non-central pixels having values of 2 or greater in both low pass filter direction maps in FIGS. 8A and 8B also demonstrate the occurrence of D>1 equal directions, and the 3×3 pixel arrays show expanded views of examples that occur in the demonstration sub-image for D=[1,4] and D=[5,8]. In order to achieve a greater degree of smoothing for these cases where the number of equal directions is greater than one, the expression for computing a local low pass filter can be easily modified to average over D directions of high-pass results.

Denoting each direction to be included in the average by the index $k_m$, the expression in equation (3) for local low pass filtering in a single direction is generalized to include D of them as shown in equation (4):

$$\text{lp\_filt}(i, j) = p(i, j) - \sum_{m=1}^{D} (\text{hp\_filt}(i, j, k_m))/D$$

Using the averaging shown in the above expression, a wide variety of filter shapes is achievable without explicit changes to coefficient values. As illustrated in FIG. 9 for four high pass filters, there is a total of $$\sum_{m=1}^{4} \binom{4}{m} = 15$$

low pass filter combinations for the number of equal directions D=[1,4]. The fractional values are shown in the drawing. Note that center weighting is fixed at ½ for all D, and other nonzero coefficients are equal to 1/(4D).

FIG. 9 illustrates all orientations of fifteen total low pass filter weights for number of equal directions using four high pass filters.

FIG. 10 is a table of low pass filter weights for number of equal directions (D) using eight high pass filters. The number of different filters (N) is in the rightmost column.

When eight directional high pass filters are used, there are a total of 255 different low pass filter combinations. For each value of D=[1,8], the possible tap weight values and number of filter combinations, $$N = \binom{8}{D},$$

are tabularized in FIG. 10. Regardless of the number of directions averaged, the center coefficient is again fixed at a value ½. The other fifteen distinct fractional off-center tap values have a maximum of ¼ for D=[1,3] and a minimum of 1/32 for D=8.

Figure 11A:
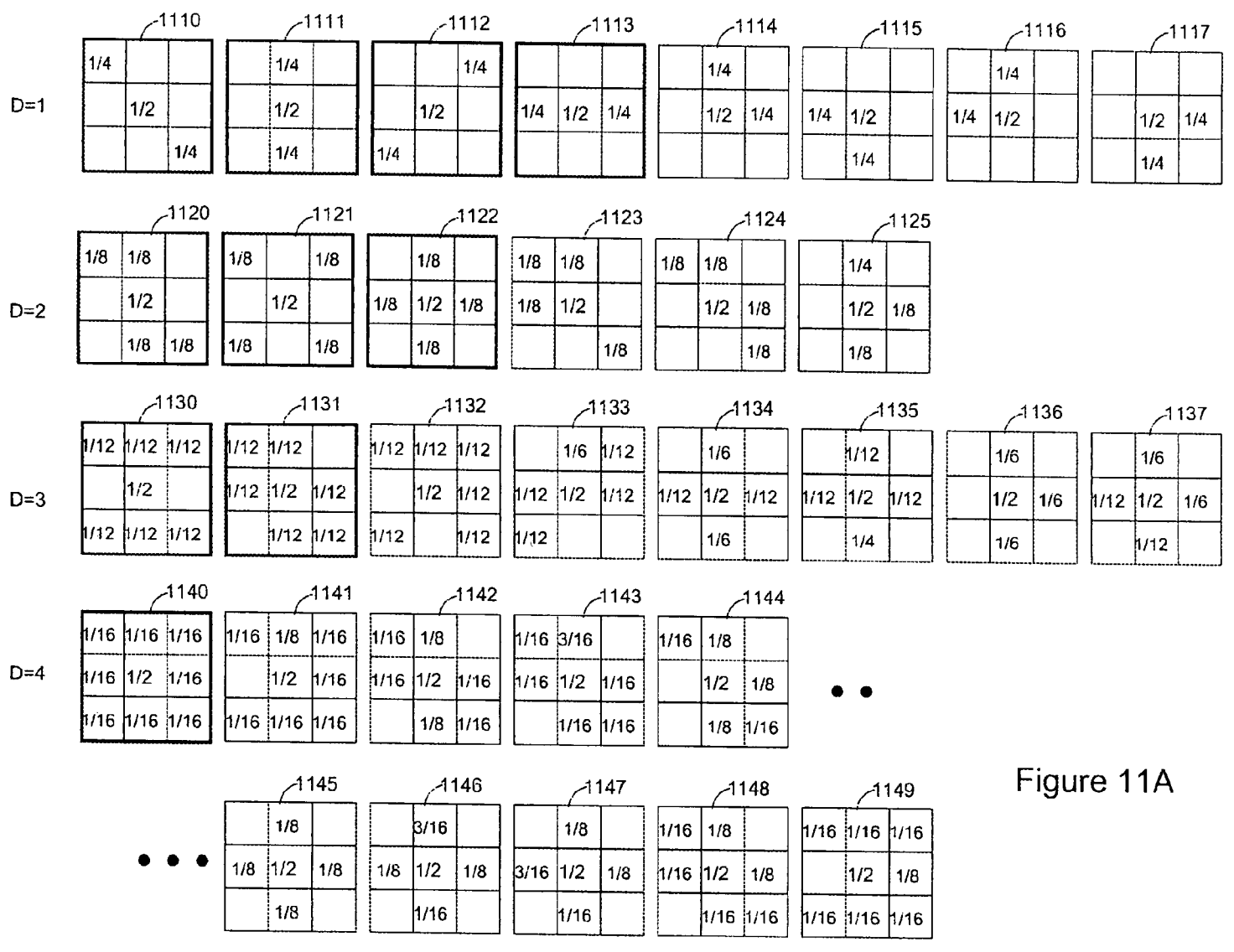
Figure 11B:
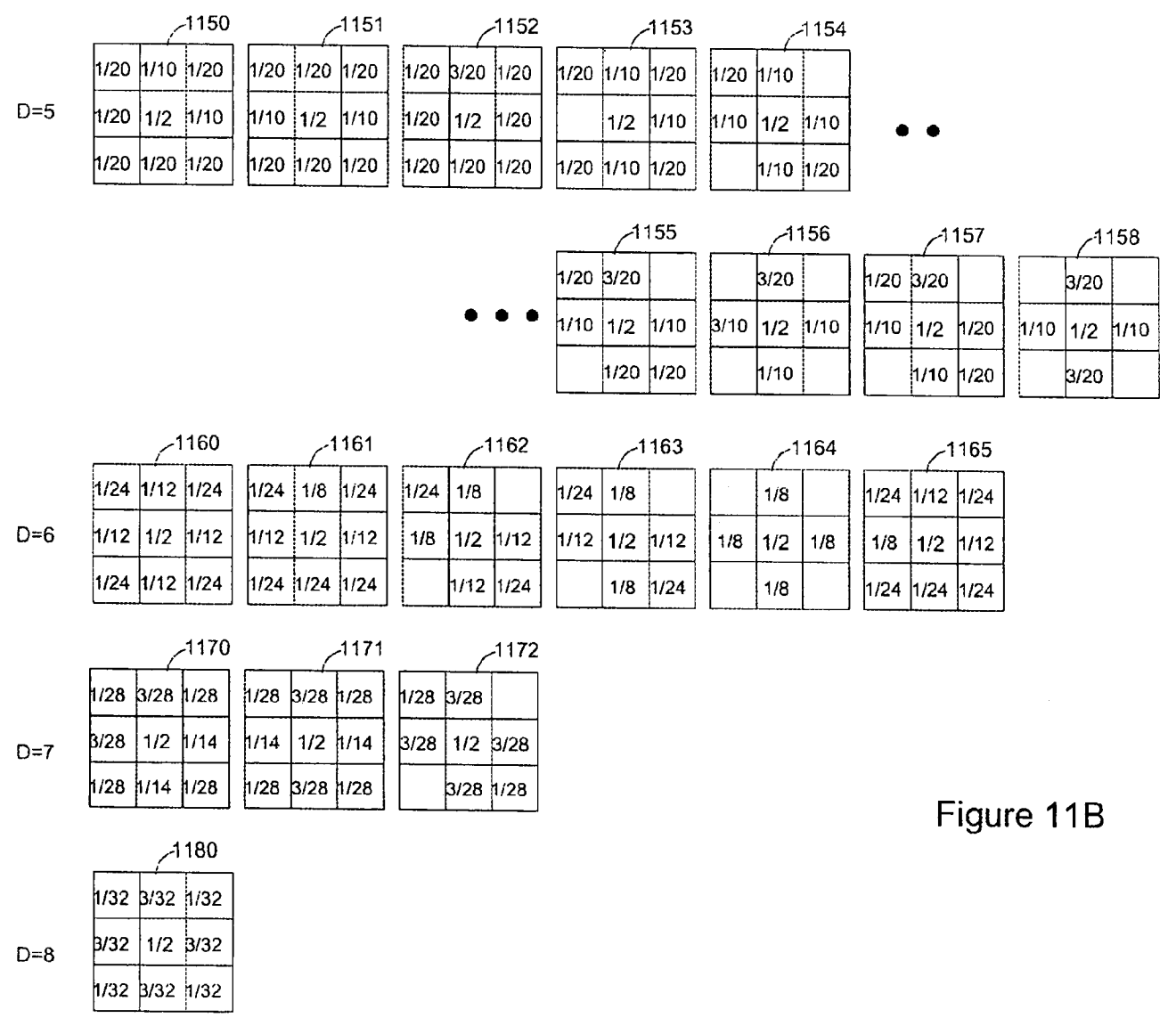

FIGS. 11(A and B) provides a more visual illustration of low pass filter combinations for eight high pass filter directions D=[1,8]. FIGS. 11A and 11B show low pass filter shapes for D=[1,8]. FIG. 11A shows D=[1,4], FIG. 11B shows D=[5-8]). In FIG. 11, the number of orientations is shown in the center of each 3×3 array. The center pixel values for each array is ½.

Because of the high number of filters possible, only a single orientation is displayed for each filter shape. The following table indicates the number of similar shapes achievable by either rotation or reflection about horizontal or vertical axes:

Table of number of orientations for each filter kernel D = [1,8]

| D = 1 | | D = 2 | | D = 3 | | D = 4 | | D = 5 | | D = 6 | | D = 7 | | D = 8 | |
|---|---|---|---|---|---|---|---|---|---|---|---|---|---|---|---|
| kernel | # | kernel | # | kernel | # | kernel | # | kernel | # | kernel | # | kernel | # | kernel | # |
| 1110 | 1 | 1120 | 4 | 1130 | 2 | 1140 | 3 | 1150 | 8 | 1160 | 4 | 1170 | 4 | 1180 | 1 |
| 1111 | 1 | 1121 | 1 | 1131 | 6 | 1141 | 8 | 1151 | 4 | 1161 | 1 | 1171 | 2 | | |
| 1112 | 1 | 1122 | 3 | 1132 | 4 | 1142 | 8 | 1152 | 4 | 1162 | 3 | 1172 | 2 | | |
| 1113 | 1 | 1123 | 5 | 1133 | 24 | 1143 | 8 | 1153 | 4 | 1163 | 5 | | | | |
| 1114 | 1 | 1124 | 3 | 1134 | 4 | 1144 | 8 | 1154 | 5 | 1164 | 3 | | | | |
| 1115 | 1 | 1125 | 12 | 1135 | 4 | 1145 | 3 | 1155 | 8 | 1165 | 12 | | | | |
| 1116 | 1 | | | 1136 | 4 | 1146 | 4 | 1156 | 4 | | | | | | |
| 1117 | 1 | | | 1137 | 8 | 1147 | 8 | 1157 | 17 | | | | | | |
| | | | | | | 1148 | 16 | 1158 | 2 | | | | | | |
| | | | | | | 1149 | 4 | | | | | | | | |
| total # > | 8 | | 28 | | 56 | | 70 | | 56 | | 28 | | 8 | | 1 |

Note that the total of these integers for each of D=[1,8] is in agreement with the value of N given in the rightmost column of FIG. 10.

For D=1, eight filter kernels 1110 . . . 1117 are illustrated, and N=8.

For D=2, six filter kernels 1120 . . . 1125 are illustrated, and N=28.

For D=3, eight filter kernels 1130 . . . 1137 are illustrated, and N=56.

For D=4, ten filter kernels 1140 . . . 1149 are illustrated, and N=70.

For D=5, nine filter kernels 1150 . . . 1158 are illustrated, and N=56.

For D=6, six filter kernels 1160 . . . 1165 are illustrated, and N=28.

For D=7, three filter kernels 1170 . . . 1172 are illustrated, and N=8.

For D=8, one filter kernel 1180 is illustrated, and N=1.

The filter kernels (1110, 1111, 1112, 1113, 1120, 1121, 1122, 1130, 1131, 1140) outlined in bold for D=[1,4] in FIG. 11 indicate that ten of the 51 low pass filter shapes displayed are also achievable using only four directional high pass filters. Note that because of the reuse of p(i±1,j) and p(i,j±1) for right angle corner filters k=[5,8], greater weight tends be assigned to these four pixels immediately adjacent to p(i,j) than to the four diagonal neighbors p(i±1,j±1), particularly for high numbers of equal directions (D>4).

In order to take full advantage of the multi-directional low pass filter shapes offered by the averaging in equation (4), a non-negative offset parameter, A, can be introduced so that all directions of k for which |hp_filt(i,j,k)|−hp_min(i,j,k$_{min}$) ≤Δ are included in the average. Using a value of Δ greater than zero can promote low pass filtering at p(i,j) where hp_min(i,j,k$_{min}$)=0, thereby decreasing the number of pixels for which no local smoothing would otherwise be applied.

Center Weighting Variation

According to a feature of the invention, added flexibility in low pass filter shape can be achieved rather easily by variation in the relative weight of the center tap. While the averaging expression in equation (4) assigns a fixed value of ½ to the center pixel of the 3×3 array, this relative weight can be varied in the range of unity (which is the identity filter), down to zero, which gives the weighted average of only two, four, six or eight neighboring pixels around p(i,j). Such variation is accomplished by introduction of the parameter α=[0,2] into the calculation of the unity-gain local low pass filter as shown in the following equation (5):

$$lp\_filt(i, j) = p(i, j) - \alpha \cdot \sum_{m=1}^{D} (hp\_filt(i, j, k_m)/D$$

The smoothing effects from low pass filtering are increasingly strong as α increases; nominal low pass filtering with ½ assigned to the center coefficient is achieved for α=1, and the value of the center pixel p(i,j) is completely ignored for α=2.

MatLab Simulation and Results

A MatLab simulation was performed to evaluate the techniques described herein above.

Matlab is a well known tool for doing numerical computations with matrices and vectors, available from The MathWorks, Inc., 3 Apple Hill Drive, Natick, Mass. 01760-2098.

Figure 12:
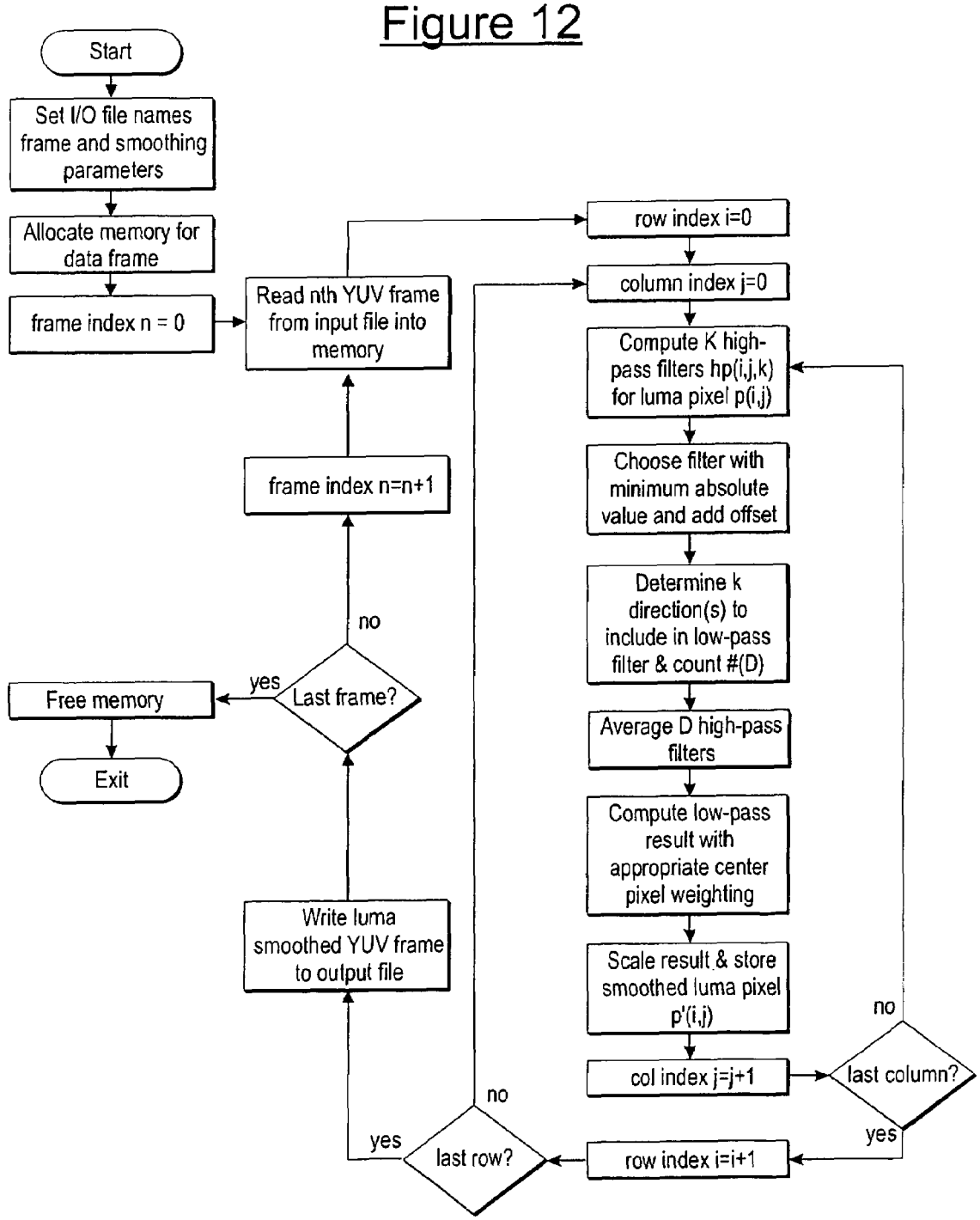
FIG. 12 is a high-level flowchart of processing flow for adaptive directional spatial low-pass filtering, according to the invention.

The MatLab implementation of the routine depicted in the flowchart of FIG. 12 (high-level processing flow for adaptive directional spatial low-pass filtering) indicates the modifications presented herein above—namely, a reduced set of four directional high pass filters, multi-directional averaging with offset parameter Δ, and center weighting variation settable to either the standard fixed value of ½ or automatically varying to any value between two parameters depending upon the local value of hp_min(i,j,k$_{min}$)+Δ. All calculations are done on an array basis, using unsigned 8-bit integer input and output luminance images and double precision working arrays for computations of intermediate values.

Grayscale versions of pseudo-color images showing which of four directions are included in local low pass averages were generated for several sample frames of different video sequences. Grayscale images for each of the four directions showed low pass contributions to the local average. Excluded from low pass filtering, local edges occurred in the expected directions to form outlines of the objects within the sample frame. For object boundaries more than one pixel in width, extended edges appeared as double lines. It was noted that minimal blurring of object details, such as the eyes and mouth of persons in a sample frame, occurred by avoiding averaging across the short local edges in one or more of the four directions. In order to maximize contrast, both the original and smoothed images were displayed in a pseudo-color palette converted to grayscale. Comparison of the original and smoothed images showed that edge detail is well preserved in the directional smoothing process for nominal center weighting of ½ (α=1).

The effect of variation in center weighting was also demonstrated. This was done by generating pseudo-color images representing the absolute value of pixel differences between images before and after smoothing, for the sample frame, for relative center weights of 25% and 50%. Comparison of the pseudo-image for α=1.5 and α=1 showed higher difference values due to the greater degree of smoothing resulting from decreasing center weighting from ½ to ¼.

The approach used to evaluate the effectiveness of spatial noise reduction was to compare encoded bitrates of these sequences with and without luminance smoothing for fixed quantization values. As listed in the table below, three versions of directional filtering with an offset value of Δ=4 were compared; adaptive center weighting was performed for both eight and four high pass filters, while a fixed value of α=1 was used to assign the standard center tap value of ½.

Naming convention for spatial noise reduction filters:

| Algorithm | Description |
|---|---|
| A | 8-filter directional (Δ = 4, adaptive α = [0, 1.5]) |
| B | 4-filter directional4a (Δ = 4, adaptive α = [0, 1.5]) |
| C | 4-filter directional4 (Δ = 4, fixed α = 1) |
| D | adaptive wiener_3 × 3 |
| E | adaptive wavelet |
| F | 3 × 3 median |

After applying each of the above algorithms to luminance pixels in each frame of several test video sequences, compression was performed using an encoding tool, at fixed quantization values. Averaged over all frames in each sequence, PSNR values were plotted in dB as a function of log data rate for unfiltered and smoothed sequences. All relatively straight lines, the graphs showed reductions in both PSNR (measured against the uncompressed original sequence, PSNR values for smoothed sequences reflect loss due to low pass filtering as well as compression) and data rate compared to unsmoothed results for Q=4,8,12. It was noted that, without denoising, the data rate required to encode at Q=4 varied from only 272 kbps for one sequence to more than 1.9 Mbps for another of the video sequences. Although PSNR loss due to smoothing with the six algorithms also depends upon the sequence and data rate, MatLab's median (F) filter consistently showed by far the most drastic reductions. Of the adaptive algorithms, MatLab's Wiener (D) filter exhibited the most aggressive smoothing, and eight-filter directional (A) and wavelet-based (E) denoising tended to show the least.

Recognizing the lack of correlation between PSNR and perceived video quality, side-by-side subjective evaluations at three bit rates for five sequences and numerous algorithms were made by three expert viewers. To facilitate comparisons of subjective quality with and without spatial luminance noise reduction at comparable data rates, the original sequences were encoded for all values of Q in the range [4,16] using the approach described below.

The general observations for subjective testing results given in the above figure are:

1. Both 3×3 Wiener and median filters consistently degrade video quality,
2. Adaptive de-noising for four-directional (B and C) and wavelet based (W) algorithms result in perceived quality at least as good as that for unfiltered sequences in all cases, 3. Performing somewhat worse than either B or C, directional filtering using eight filters (A) showed slight degradation for 'mobile' and 'hall' sequences.

Comparative evaluations were made of the adaptive and nonlinear filters for two of the video sequences. The results for these sequences also demonstrated the effectiveness of adaptive directional and wavelet-based filters for spatial noise reduction.

Implementation in C

Having used MatLab simulations to establish the potential effectiveness of four-directional filtering in spatial denoising, the enhanced noise reduction algorithm has been implemented in C for inclusion as a pre-processing option for an Offline Encoder. The source code used for a stand-alone version with fixed offset ($\Delta$) and center tap weighting ($\alpha$) parameters is set forth below. As described below, this C implementation uses 16-bit integer arithmetic exclusively, without any division required for averaging or normalization and without loss of precision in the calculation of intermediate values.

Integer operation with maximum precision was made possible by simply scaling up fractional tap values described hereinabove, using 16-bit integers for intermediate results, deferring normalization to the final step, restricting all denominators to powers of two and rounding final eight-bit output values. Based upon scaled high pass coefficient values {−1, 2, −1}, the four 3×3 arrays in the first row of FIG. 13 show sample orientations of total high pass tap weights resulting from summing over D=1, 2, 3 or 4 equal directions. Multiplication by an integer whose value depends on both D and $\alpha$ before subtracting from appropriately scaled center pixel p(i,j) produces non-negative low pass filter coefficients such as those for center tap weighting of 53% appearing in the bottom row of FIG. 13. This figure is a diagram of sample high pass filter totals (top) and the sum of gain-256 low pass filters ($\alpha=15/16$, relative center weighting=53%).

For hp_filt(i,j,k) high pass filter taps four times those defined in equation (1) set forth above, and integer multiplicative weighting factors denoted by w($\alpha$,D), the general expression for 16-bit low pass average with coefficients summing to integer M is given by the following equation (6):

$$M \cdot \text{lp\_filt}(i, j) = M \cdot p(i, j) - w(\alpha, D) \sum_{m=1}^{D} \text{hp\_filt}(i, j, k_m)$$

Choosing M to be a power of two, the final rounded eight-bit low pass filter output for pixel p(i,j) can be computed by simply adding M/2 and shifting right by $\mu = \log_2(M)$ bits.

$$\text{lp\_filt}(i,j) = (M \cdot \text{lp\_filt}(i,j) + M/2) >> \mu$$

Requiring that M be a power of two and restricting all w($\alpha$,D) weighting factors to integer values limits the achievable values of the center weighting parameter $\alpha$. These values are listed in the following Table (for M=256) as an indexed array showing $\alpha$(n), the associated center weighting percentage, and w (n,D) for D=[1,4] directions. Although these weighting factors can easily be computed by:

$w_n(3) = n >> 2$ $w_n(1) = 3 \cdot w_n(3)$ $w_n(2) = w_n(1) >> 1$ $w_n(4) = w_n(2) >> 1$ they can also preferably be stored as a look-up-table. Note that the indices n=[0,10] give center weightings from 100% down to 6% for all values of D, with integer multiplication.

Table

Center weights, alpha and multipliers for computation of low pass filter from high pass filter totals It should be appreciated that the value if M can be varied to provide finer (M=256) or coarser (M<256) gradations.

| index (n) | alpha $\alpha$(n) | center weight | high pass weighting values: w(n, D) | | | |
|---|---|---|---|---|---|---|
| | | | D = 1 | D = 2 | D = 3 | D = 4 |
| 0 | 0 | 100% | 0 | 0 | 0 | 0 |
| 1 | 3/16 | 91% | 12 | 6 | 4 | 3 |
| 2 | 3/8 | 81% | 24 | 12 | 8 | 6 |
| 3 | 9/16 | 72% | 36 | 18 | 12 | 9 |
| 4 | 3/4 | 63% | 48 | 24 | 16 | 12 |
| 5 | 15/16 | 53% | 60 | 30 | 20 | 15 |
| 6 | 1 1/8 | 44% | 72 | 36 | 24 | 18 |
| 7 | 1 5/16 | 34% | 84 | 42 | 28 | 21 |
| 8 | 1 1/2 | 25% | 96 | 48 | 32 | 24 |
| 9 | 1 11/16 | 16% | 108 | 54 | 36 | 27 |
| 10 | 1 7/8 | 6% | 120 | 60 | 40 | 30 |

While 53% center weighting worked well for the relatively clean sequences, very noisy images required more aggressive smoothing. It was experimentally determined that the parameters $\alpha(7) = 21/16$ for 34% center weighting and an offset of $\Delta=32$ do result in significant reduction in spatial noise. When displayed using a pseudo-color palette displayed in grayscale, speckles seen in a sub-image of a single frame of the noisy video sequence were visibly reduced in the directionally smoothed sub-image. And, importantly, text within the smoothed sub-image was still legible.

The problem of using fixed parameters is that the degree of smoothing should be adjusted for the source sequence and the desired bit rate. In another test, it was experimentally shown that when $\alpha(7)$ and $\Delta=32$ was applied to the another image sequence, the noticeable blurring of facial detail will only be acceptable for very low bit rates where compression artifacts dominate. Depending on the operational scenario, it may be advisable to allow the user to choose the degree of smoothing if a robust method for automatic adjustment in offset and center tap weighting parameters cannot be developed.

Although the invention has been described in connection with various specific embodiments, those skilled in the art will appreciate that numerous adaptations and modifications may be made thereto without departing from the spirit and scope of the invention as set forth in the claims. For example, software implementation in C could be sped up by using assembly language. Moreover, implementations of the invention could include:

1) spatial smoothing applied to chrominance as well as luminance image pixels,
2) circularly symmetric high pass filters for local edge detection,
3) a robust method of automatic parameter adjustment to achieve optimal performance for a broad range of input sequences of varying quality, and
4) temporal noise reduction.

What is claimed is:

1. A method of reducing spatial noise in an image having a plurality of pixels, comprising:
   detecting object boundaries and unstructured areas in the image by applying 3-tap high pass filters to each pixel in the image in at least four directions to determine the best direction(s) for local low pass filtering wherein the 3-tap high pass filters have center coefficients;
   varying relative weighting of the center coefficients from zero to unity; and
   applying low pass filtering only along object boundaries and unstructured areas within the image so as to minimize the tendency to blur image edges.

2. A method according to claim 1, further comprising:
   when high-pass filtering results are nearly equal in absolute value with one another, applying multi-directional low pass filtering.

3. A method according to claim 1, further comprising:
   when high-pass filtering results are nearly equal in absolute value, applying multi-directional low pass filtering without explicit tap weight changes.

4. A method according to claim 1, further comprising:
   introducing an offset parameter ($\Delta$) to the high pass filters to promote smoothing.

5. A method according to claim 1, wherein the high pass filters have a minimum absolute value, and further comprising:
   introducing an offset parameter ($\Delta$) to the high pass filters to promote smoothing even when the minimum absolute value of the high pass filters is zero.

6. A method according to claim 1, wherein:
   the low pass filtering is applied to pixel luminance values.

7. A method according to claim 1, further comprising:
   restricting local low pass filtering to directions that do not cross image edges.

8. A method according to claim 1, wherein:
   the high pass filters are 3-tap zero-mean high pass filters; and
   further comprising:
   determining an optimum direction for low pass filtering by using tap coefficients where the center tap coefficient is twice that of the taps applied to the neighboring pixels which have an opposite sign.

9. A method according to claim 1, further comprising:
   using a set of only four high pass filters to locate horizontal, vertical and diagonal image edges passing through the center of a 3×3 pixel array.

10. A method according to claim 1, further comprising:
    choosing the direction for low pass filtering by comparing results of the high pass filters with a minimum absolute value for each of the selected ones of the pixels in the image.

11. A method according to claim 1, further comprising:
    performing high pass filtering for the selected ones of the pixels in a horizontal, vertical and two diagonal directions.

12. A method according to claim 1, wherein said 3-tap high pass filters are applied to each pixel in the image in at least four, but less than eight directions to determine the best direction(s) for local low pass filtering.

13. A method of performing directional smoothing of an image, comprising:
    for each pixel p(i,j) in a video frame of I rows by J columns, computing a set of zero-mean high-pass filters with tap weights, where the center tap coefficient is twice that of the taps applied to the neighboring pixels which have an opposite sign, for only the horizontal, vertical, and two diagonal directions; and
    applying low pass filtering only along object boundaries and unstructured areas within the image so as to minimize the tendency to blur image edges.

14. A method according to claim 13, wherein each pixel is a center pixel in a 3×3 array of pixels, the array having top, middle and bottom horizontal rows and leftmost, middle and rightmost vertical columns, further comprising:
    leaving the top and bottom horizontal rows in the 3×3 array unfiltered; and
    leaving the leftmost and rightmost vertical columns unfiltered.

15. A method according to claim 13, further comprising:
    determining the high-pass filter with the minimum absolute value as expressed in the following equation:

$|hp\_min(i,j,k_{min})| = min_k(|hp\_filt(i,j,k)|)$.

16. A method according to claim 13, further comprising:
    applying a unity gain 3×3 low pass filter with tap weights, where the center tap coefficient is twice that of the taps applied to the neighboring pixels which have an opposite sign, in the direction of $k_{min}$ for local smoothing of the image pixel p(i,j).

17. A method according to claim 16, wherein:
    the low pass filter is calculated from the signed value of $hp\_filt(i,j,k_{min})$ by simple subtraction, as in the following equation:

$lp\_filt(i,j,) = p(i,j,) - (hp\_filt(i,j,k_{min}))$.

18. A method according to claim 13, further comprising:
    calculating distribution statistics for each filtered pixel by summing the number of high pass directions for which the absolute value matches that of the minimum.

19. A method according to claim 13, further comprising:
    determining the number of equal directions, and
    when the number of equal directions is greater than one, computing a local low pass filter by averaging over D directions of the high pass results, according to the following equation:

$$lp\_filt(i, j) = p(i, j) - \sum_{m=1}^{D} (hp\_filt(i, j, k_m)/D.$$

20. A method according to claim 19, further comprising:
    creating a variety of filter shapes without making explicit changes to coefficient values.

21. A method according to claim 19, further comprising:
    introducing a non-negative offset parameter ($\Delta$) so that all directions of k for which $|hp\_filt(i,j,k)| - hp\_min(i,j,k_{min}) \leq \Delta$ are included in the low-pass average.

22. A method according to claim 21, wherein:
    a value of the offset parameter ($\Delta$) greater than zero promotes low pass filtering at p(i,j) where $hp\_min(i,j,k_{min})=0$, thereby decreasing the number of pixels for which no local smoothing would otherwise be applied.

* * * * *